Sept. 14, 1926.                    1,600,002
E. W. KINGERY
MEAT MANGLING MACHINE
Filed March 24, 1925
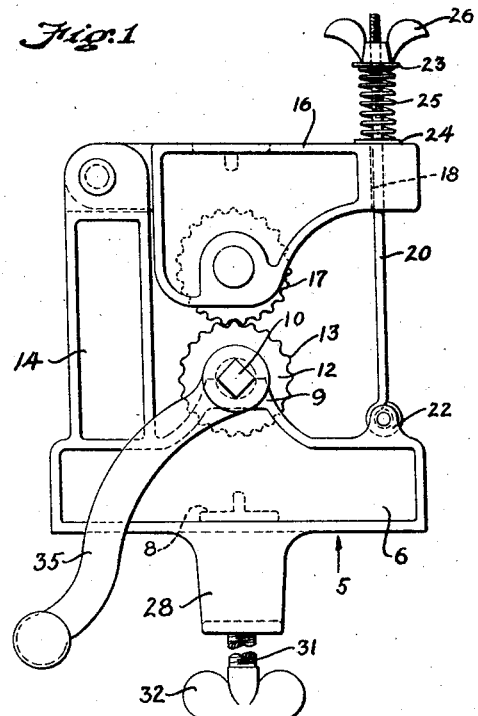
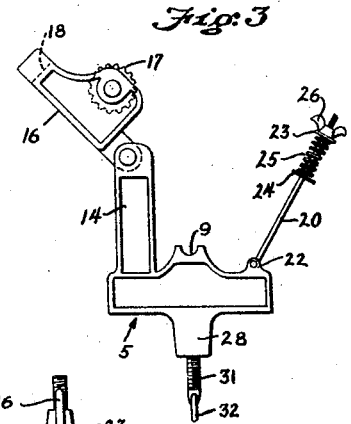
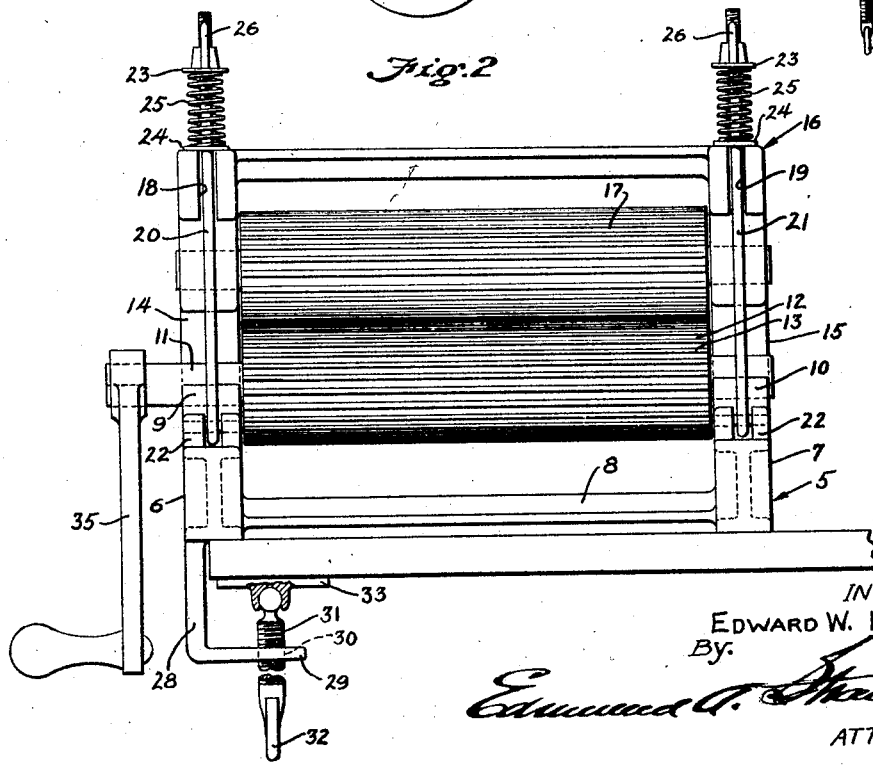
INVENTOR.
EDWARD W. KINGERY
By
ATTORNEY.

Patented Sept. 14, 1926.

UNITED STATES PATENT OFFICE.

EDWARD W. KINGERY, OF WHITTIER, CALIFORNIA.

MEAT-MANGLING MACHINE.

Application filed March 24, 1925. Serial No. 17,909.

This invention relates more specifically to a machine for rendering tough or inferior cuts of meats tender.

It is an important object of this invention to provide a simple mechanism for quickly and effectually mangling cuts of meats in the form of steaks to render the same tender and more palatable after cooking.

A further object is to provide a machine in which the mangling pressure exerted against the meats being operated upon is uniform throughout their area.

A still further object is to provide a machine in which the meat mangling elements are automatically adjustable, whereby to effectually mangle steaks of unequal thicknesses.

A still further object is to provide a machine in which the meat mangling elements may be quickly cleansed after an operation.

This disclosure is to be regarded as descriptive only and not as restrictive or limitative of the invention, of which obviously an embodiment may be constructed including many minor modifications without departing from the general scope herein indicated and hereinafter claimed.

The above objects are accomplished by means of the device herein described and illustrated in the accompanying drawings, in which:

Fig. 1 is an end elevation of the machine.

Fig. 2 is a front elevation of the machine.

Fig. 3 is a view similar to Fig. 1, only on a smaller scale, showing the machine in a position for cleansing, the lower meat roller being removed therefrom.

Certain cuts of meats, such as flank, round, and sirloin beef steaks, are generally so tough and fibrous as to render the same unpalatable after cooking. When using such cuts of meats it has been the practice to cut the surfaces of the steaks, or to pound the same with a mallet, in order to break down the tissues and thereby render the same tender when cooked.

While such methods of mangling steaks have in the main proven satisfactory, yet as the blows struck by the mallet are not always uniform, portions of the steaks will remain in the same condition after the operation. By means of the mechanism hereinafter described a uniform rolling pressure will be simultaneously applied to both sides of meat steaks to mangle the same with a minimum effort on the part of the operator.

Broadly the invention consists of a cast metal base frame, provided with a removable meat mangling roll, and a swinging frame secured to the base frame having a similar meat mangling roll normally in contact with the first mentioned roll, the swinging frame being held in operative relation to the base or main frame by a spring tension means.

Referring more specifically to the drawings, 5 designates a cast metal base frame consisting of a pair of end members 6, 7, spaced apart and connected together by means of a transversely disposed brace 8. The upper edges of the end members are each provided midway of their ends with bearings 9, 10, in which is mounted a shaft 11, carrying a meat mangling roll 12 provided on its surface with longitudinally extending corrugations, or ribs 13, of any approved form. Extending upwardly from like ends of members 6, 7, and preferably cast integral therewith, are posts 14, 15, to the upper ends of which is pivotally secured a swinging frame member 16. Journalled in this frame is a meat mangling roll 17, similar in configuration to its companion roll on the base frame with which it normally contacts when the machine is not in operation. The free ends of member 16 are each provided with a vertically disposed slot 18, 19, for the reception of a pair of rods 20, 21, pivotally secured between lugs 22, formed on the upper edge of end members 6, 7, adjacent their ends. The upper ends of rods 20, 21, are threaded and extend beyond the upper edge of the swinging frame member, as clearly shown in Figs. 1 and 2 of the drawings. Interposed between washers 23, 24, are coiled tension springs 25, wing thumb nuts 26 engaging the threaded ends of the rods bearing against the washers 23, and holding the springs in position on the rods.

One of the end members is provided on its under face and midway of its ends with a downwardly extending arm 28, having an inturned end 29, provided with a screw threaded aperture 30. Mounted in aperture 30 is a clamping bolt 31, having a wing thumb piece 32 on its lower end and a clamp 33, universally secured to its upper end. By means of this clamp the machine may be rigidly secured to a support such as a table top as shown in Fig. 2.

Power to rotate the mangling rolls is supplied through the medium of a crank handle 35 secured to one end of the shaft, on which the lower mangling roll is mounted.

The operation of the machine will be obvious from the following description. When it is desired to mangle steaks of certain thicknesses the winged nuts are rotated upwardly or downwardly to diminish or increase the tension on the upper meat mangling roll, depending entirely upon the character of the meat that is to be passed between the rolls. Thus if the cut of meat is normally only slightly tough, the tension on the upper roll is diminished. The steaks to be operated upon are then passed between the rolls, the springs permitting of an upward swinging movement of the pivoted frame for the passage of the steaks between the rolls.

As the steak passes between the rolls the corrugated or ribbed surfaces of the same will penetrate the surfaces of the steak, thus rendering the same as tender as more expensive meat cuts. By means of the swinging frame the lower mangling roll may be readily removed from its bearing, thus enabling the operator to quickly and thoroughly cleanse the rolls after a mangling operation.

From the above it will be apparent that I have provided a simple mechanism that will quickly and effectively mangle meats in the form of steaks in a uniform manner, the pressure of the mangling elements against the surface of the steaks being readily varied to suit steaks of varying degrees of toughness.

What I claim is:

A meat tenderer comprising a base frame consisting of two end members, a brace connecting said end members, a pair of uprights mounted on the extremities of said end members, a swinging frame pivotally connected to the uprights, said end members being provided with bearings, a mangling roll detachably mounted in said bearings, a cooperating mangling roll carried by the swinging frame, a pair of rods pivotally connected to said end members at the extremities opposite to said uprights, said swinging frame being provided with slots for receiving the upper ends of said rods, said rods being provided with springs and wing nuts bearing against said swinging frame.

In witness that I claim the foregoing I have hereunto subscribed my name this 6th day of March, 1925.

EDWARD W. KINGERY.